United States Patent
Philpott et al.

(10) Patent No.: US 11,555,524 B2
(45) Date of Patent: Jan. 17, 2023

(54) BRAKE ASSEMBLY HAVING A PAD SHIELD AND METHOD OF ASSEMBLY

(71) Applicant: ArvinMeritor Technology, LLC, Troy, MI (US)

(72) Inventors: Daniel Philpott, Goodrich, MI (US); Alex Adkins, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 86 days.

(21) Appl. No.: 16/930,169

(22) Filed: Jul. 15, 2020

(65) Prior Publication Data

US 2022/0018408 A1    Jan. 20, 2022

(51) Int. Cl.
| | | |
|---|---|---|
| *F16D 65/00* | (2006.01) | |
| *F16D 55/22* | (2006.01) | |
| *F16D 55/00* | (2006.01) | |

(52) U.S. Cl.
CPC ......... *F16D 65/0081* (2013.01); *F16D 55/22* (2013.01); *F16D 2055/0037* (2013.01); *F16D 2250/0084* (2013.01)

(58) Field of Classification Search
CPC ...... F16D 65/0081; F16D 55/22; F16D 55/00; F16D 2055/0037; F16D 2250/00; F16D 2250/0084; F16D 2055/0033; B60T 1/065; B60T 1/06
See application file for complete search history.

(56) References Cited

U.S. PATENT DOCUMENTS

| | | | |
|---|---|---|---|
| D645,802 S * | 9/2011 | Henning | ...................... D12/180 |
| 8,857,575 B2 | 10/2014 | Philpott | |
| 10,131,327 B2 * | 11/2018 | Thomas | .................. B60T 1/065 |
| 10,309,470 B1 | 6/2019 | Philpott | |
| 2006/0042890 A1 * | 3/2006 | Samuelsson | .......... F16D 65/847 |
| | | | 188/73.1 |
| 2008/0110707 A1 | 5/2008 | Kromer | |
| 2014/0158482 A1 | 6/2014 | Philpott | |
| 2016/0146278 A1 | 5/2016 | Roberts | |
| 2019/0162259 A1 | 5/2019 | McGinn et al. | |
| 2020/0355232 A1 * | 11/2020 | Adkins | ............... F16D 65/0075 |

FOREIGN PATENT DOCUMENTS

| | | |
|---|---|---|
| DE | 102009023104 C5 * | 8/2013 |
| WO | 2014/097098 A1 | 6/2014 |

OTHER PUBLICATIONS

Extended European Search Report dated Oct. 22, 2021 for related European Appln. No. 21185163.9; 7 Pages.

* cited by examiner

*Primary Examiner* — Pamela Rodriguez
(74) *Attorney, Agent, or Firm* — Brooks Kushman PC (57) ABSTRACT

A brake assembly and a method of assembly. The brake housing may include a housing assembly, a retainer bracket, and a pad shield. The retainer bracket may be secured to the housing assembly. The pad shield may be installable onto and/or removable from the retainer bracket when the retainer bracket is secured to the housing assembly.

22 Claims, 8 Drawing Sheets

BRAKE ASSEMBLY HAVING A PAD SHIELD AND METHOD OF ASSEMBLY

TECHNICAL FIELD

This document relates to a brake assembly that has a pad shield and a method of assembly.

BACKGROUND

A brake carrier assembly having a pad shield is disclosed in U.S. Pat. No. 8,857,575.

SUMMARY

In at least one embodiment, a brake assembly is provided. The brake assembly may include a housing assembly, a retainer bracket, and a pad shield. The housing assembly may define an opening and may be adapted to receive a brake pad assembly. The retainer bracket may be secured to the housing assembly and may extend across the opening. The pad shield may extend across the opening and may be secured to the retainer bracket. The pad shield may be installable on the retainer bracket and may be removable from the retainer bracket when the retainer bracket extends across the opening and is stationarily secured to the housing assembly.

In at least one embodiment, a method of assembling a brake assembly may be provided. A housing assembly may be provided that has an opening. A retainer bracket may be positioned on the housing assembly such that the retainer bracket extends across the opening. The retainer bracket may be secured to the housing assembly such that the retainer bracket does not move with respect to the housing assembly. A pad shield may be installed on the retainer bracket after the retainer bracket is secured to the housing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
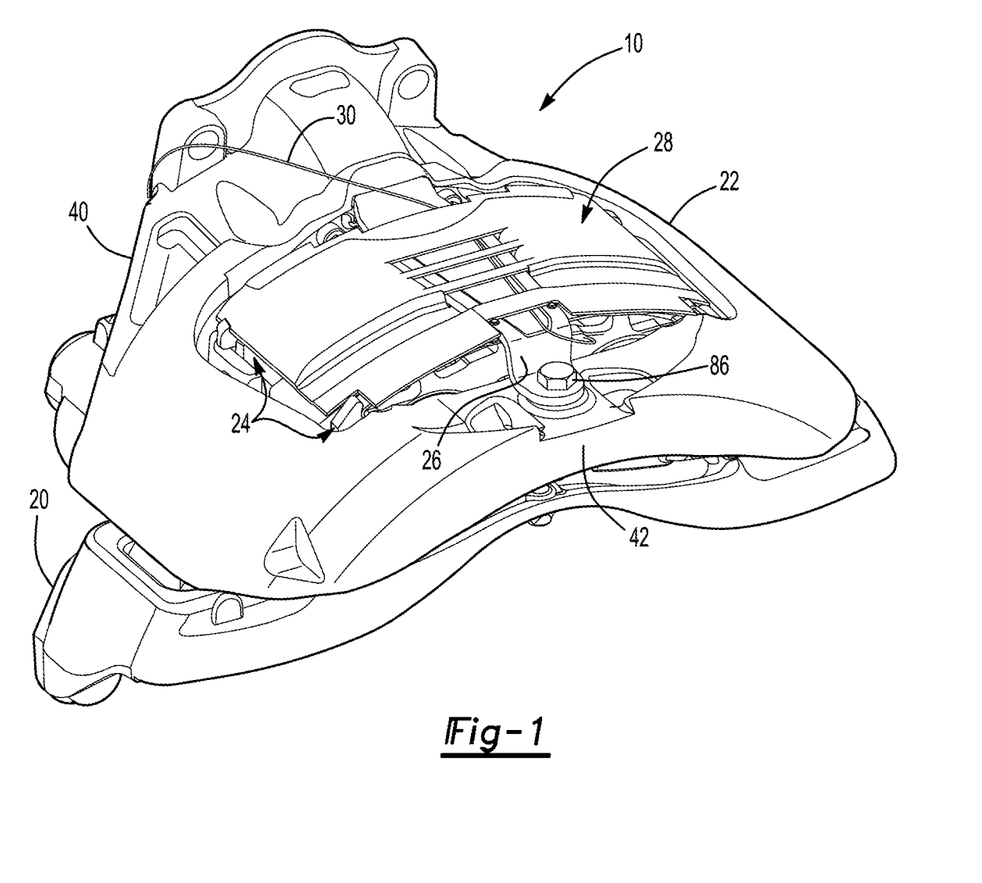
FIG. 1 is a perspective view of an example of a brake assembly having a pad shield installed on a retainer bracket.

Referring to FIG. 1, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels. In at least one configuration, the brake assembly 10 may include a brake carrier 20, a housing assembly 22, a plurality of brake pad assemblies 24, a retainer bracket 26, and a pad shield 28. Optionally, a cable 30 may also be provided with the brake assembly 10.

The brake carrier 20 may facilitate mounting of the brake assembly 10. For instance, the brake carrier 20 may be fixedly mounted to a component of the vehicle, such as an axle assembly or a knuckle. The brake carrier 20 may receive and support the brake pad assemblies 24 and may include a rotor opening that may be configured to receive a rotor. As such, the brake carrier 20 may straddle the rotor and may help position the brake pad assembly 24 on opposite sides of the rotor.

Figure 2:
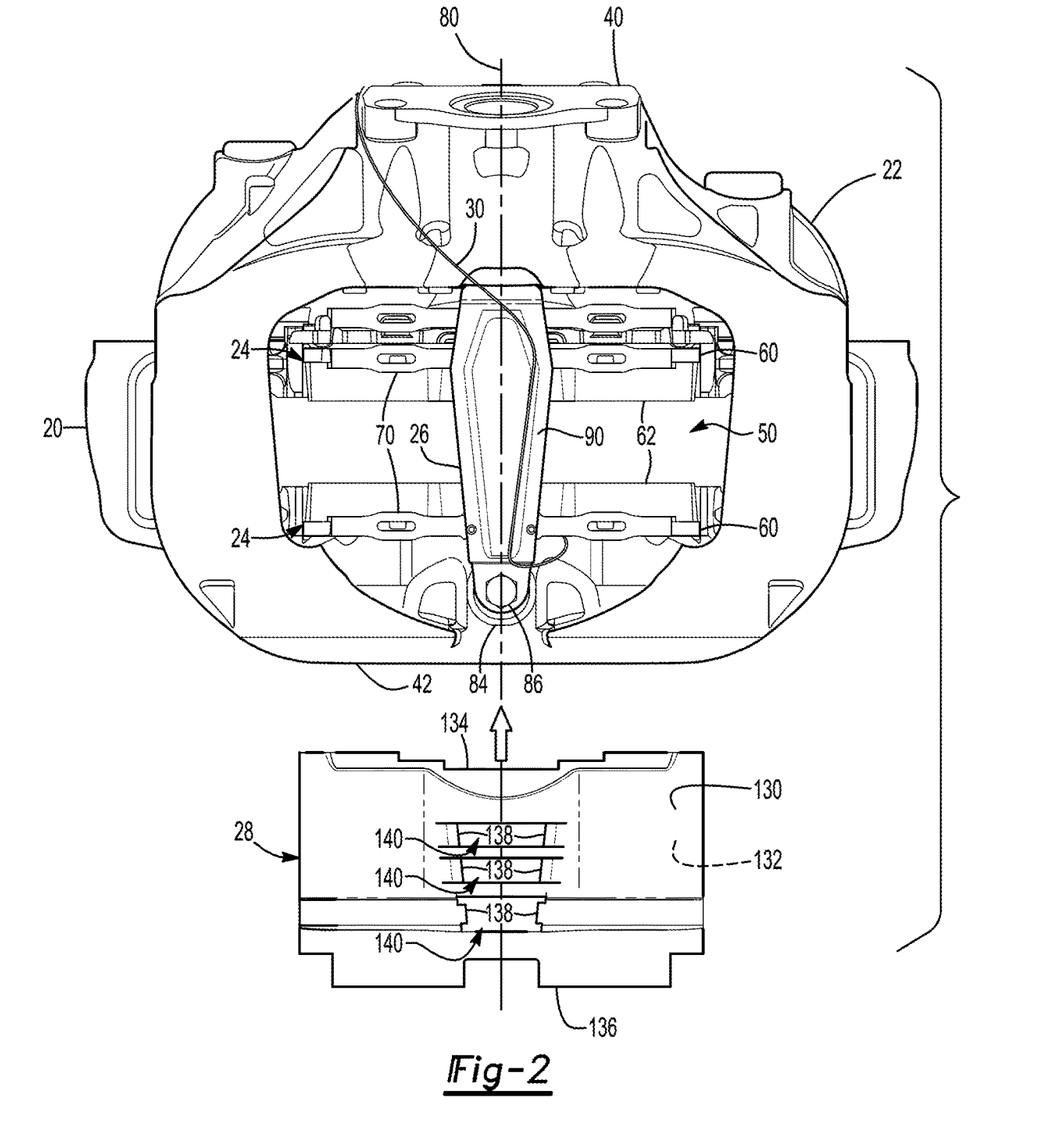
FIG. 2 is a top view of the brake assembly with the pad shield removed from the retainer bracket.

Referring to FIGS. 1 and 2, the housing assembly 22 may receive various components of the brake assembly 10. In addition, the housing assembly 22 may position of the brake pad assemblies 24 with respect to the rotor to facilitate braking of the vehicle. In at least one configuration, the housing assembly 22 may be mounted to the brake carrier 20 and may include a caliper housing 40 and a caliper bridge 42.

The caliper housing 40 may be movably disposed on the brake carrier 20. For example, the caliper housing 40 may be slidable along a pair of guide pins that may be fixedly disposed on the brake carrier 20. The caliper housing 40 may receive an actuator, such as at least one piston, that may actuate the brake pad assembly 24 into engagement with the rotor. For instance, the actuator may actuate a first brake pad assembly 24 that is disposed adjacent to the caliper housing 40 into engagement with the rotor. A reaction force may then move the caliper housing 40 and caliper bridge 42 with respect to the brake carrier 20 to actuate a second brake pad assembly 24 that is disposed adjacent to the caliper bridge 42 into engagement with an opposite side of the rotor to help slow rotation of the rotor and an associated vehicle wheel. Optionally, one or more biasing members, such as retraction springs may be provided to facilitate retraction of the brake pad assemblies 24 away from the rotor when braking is not desired.

The caliper bridge 42 may be integrally formed with the caliper housing 40 or may be a separate component that is fixedly mounted to the caliper housing 40. For example, the caliper bridge 42 may be coupled or secured to the caliper housing 40 with one or more fasteners, such as bolts. In at least one configuration, the caliper bridge 42 may cooperate with the caliper housing 40 to at least partially define an opening 50, which is best shown in FIG. 2.

The opening 50 may be adapted to receive a brake pad assembly 24. For instance, the brake pad assemblies 24 may be installed or inserted into the brake carrier 20 by inserting a brake pad assembly into the opening 50 when the retainer bracket 26 is removed. Similarly, the brake pad assembly 24 may be removed from the brake carrier 20 via the opening 50 when the retainer bracket 26 is removed. The brake pad assemblies 24, the pad shield 28, or combinations thereof may be disposed in the opening 50.

Referring to FIG. 2, a pair of brake pad assemblies 24 may be received in the brake carrier 20. The brake pad assemblies 24 may be disposed on opposite sides of the rotor and may have similar or identical configurations. As such, one brake pad assembly 24 may be positioned between the caliper housing 40 and the rotor while the other brake pad assembly 24 may be located on the opposite side of the rotor and may be positioned between the caliper bridge 42 and the rotor. In at least one configuration, a brake pad assembly 24 may include a backplate 60 and friction material 62.

The backplate 60 may be a structural member of the brake pad assembly 24. The backplate 60 may be configured as a generally flat plate and may be made of any suitable material, such as a metal alloy.

The friction material 62 may be disposed on a side of the backplate 60 that may face toward the rotor. The friction material 62 may contact the rotor during vehicle braking.

The retainer bracket 26 may be securable to the housing assembly 22. For example, the retainer bracket 26 may be installable and removable from the housing assembly 22 and may extend across the brake pad assemblies 24 and the opening 50 in the housing assembly 22 to help retain the brake pad assemblies 24 in the brake carrier 20 when the retainer bracket 26 is secured to the housing assembly 22. For instance, the retainer bracket 26 may engage or contact a brake pad assembly 24 or may engage or contact a pad spring 70, if provided, that may be disposed between the brake pad assembly 24 and the retainer bracket 26 when the retainer bracket 26 is installed and secured to the housing assembly 22.

Figure 4:
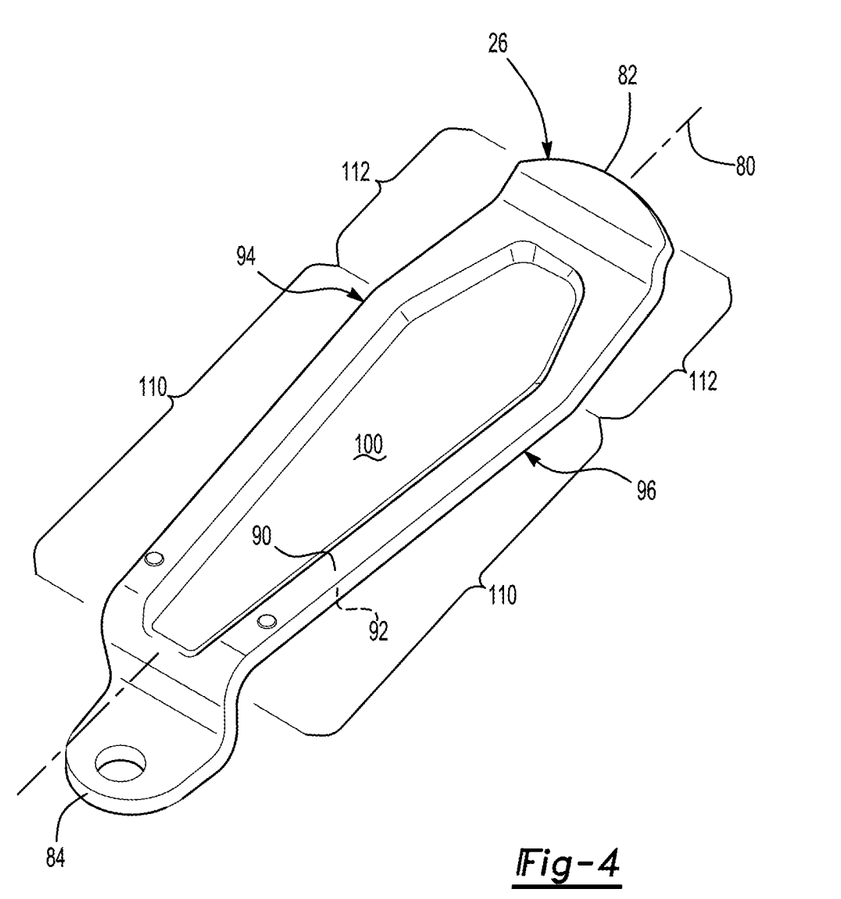
FIG. 4 is a perspective view of an example of a retainer bracket.

Referring to FIGS. 2 and 4, in at least one configuration the retainer bracket 26 may extend along an axis 80. The axis 80 may be oriented to extend between a first end 82 of the retainer bracket 26 and a second end 84 of the retainer bracket 26. As such, the retainer bracket 26 and the axis 80 may extend generally parallel to an axis of rotation of the rotor and may extend generally parallel to the axis along which the brake pad assemblies 24 are actuatable.

The first end 82 of the retainer bracket 26 may be mounted to the caliper housing 40. For instance, the first end 82 may contact the caliper housing 40 and optionally may be received in an opening, notch, or slot in the caliper housing 40.

The second end 84 of the retainer bracket 26 may be disposed opposite the first end 82. The second end 84 may be disposed on the caliper bridge 42 and may be secured to the caliper bridge 42, such as with a fastener 86 like a bolt. The fastener 86 may extend through a hole in the retainer bracket 26. In at least one configuration, the second end 84 may be offset from the first end 82 in a generally vertical direction such that the second end 84 is disposed closer to the axis of rotation of the rotor than the first end 82 is.

Figure 5:
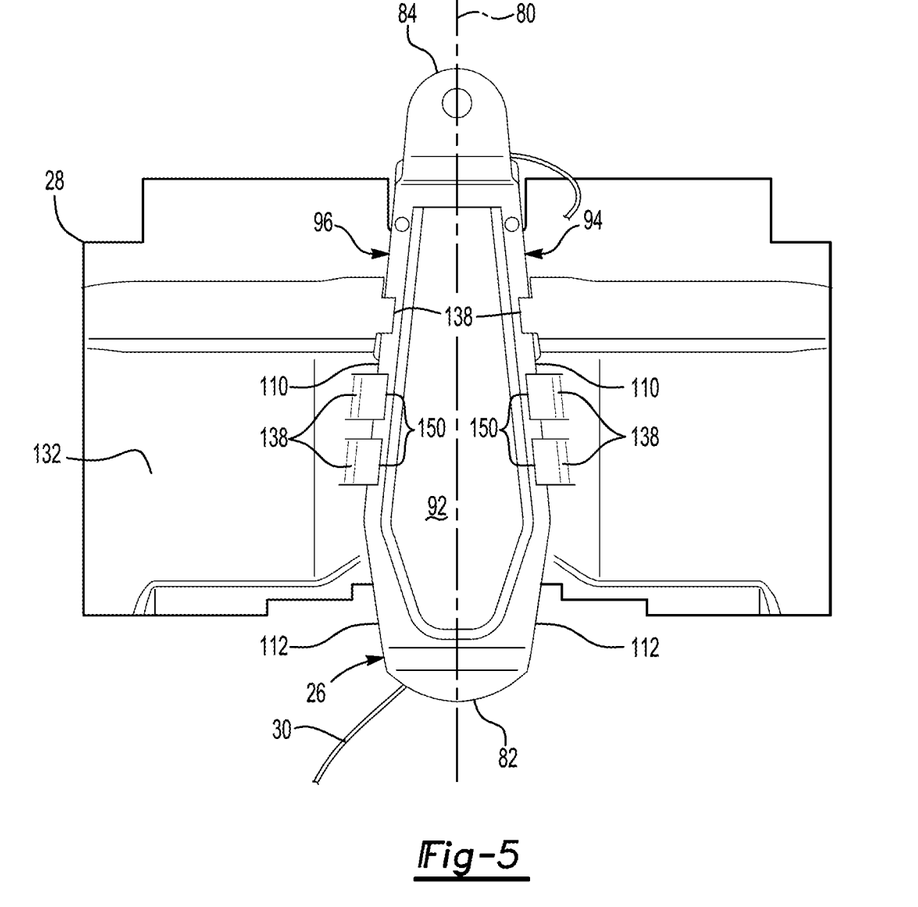
FIG. 5 is a bottom view showing the pad shield installed on the retainer bracket.

Referring primarily to FIGS. 4 and 5, the retainer bracket 26 may be provided in various configurations. In at least one configuration, the retainer bracket 26 may include a top side 90, a bottom side 92, a first lateral side 94, and a second lateral side 96.

The top side 90 may face away from the brake carrier 20 and the brake pad assemblies 24. In addition, the top side 90 may face toward the pad shield 28. Optionally, a recess 100 may extend from the top side 90 or may be provided in the top side 90. The recess 100 may extend toward the bottom side 92 and may provide a gap between the pad shield 28 and the top side 90.

The bottom side 92 may be disposed opposite the top side 90. As such, the bottom side 92 may face toward the brake pad assemblies 24 and may face away from the pad shield 28.

The first lateral side 94 may extend between the top side 90 and the bottom side 92. For instance, the first lateral side 94 may extend in a generally vertical direction from the top side 90 to the bottom side 92. In addition, the first lateral side 94 may extend between the first end 82 and the second end 84. For example, the first lateral side 94 may extend from the first end 82 toward the second end 84, from the second end 84 toward the first end 82, or from the first end 82 to the second end 84.

The second lateral side 96 may be disposed opposite the first lateral side 94. In addition, the second lateral side 96 may extend between the top side 90 and the bottom side 92. For instance, the second lateral side 96 may extend in a generally vertical direction from the top side 90 to the bottom side 92. In addition, the second lateral side 96 may extend between the first end 82 and the second end 84. For example, the second lateral side 96 may extend from the first end 82 toward the second end 84, from the second end 84 toward the first end 82, or from the first end 82 to the second end 84. In at least one configuration, the first lateral side 94, the second lateral side 96, or both may be spaced apart from the recess 100.

In at least one configuration, the first lateral side 94 or a portion thereof may be disposed in a nonparallel relationship with the second lateral side 96. For example, at least a portion of the first lateral side 94 and the second lateral side 96 may become further apart from each other or may extend further apart from each other in a first direction. The first direction may extend along the axis 80 and may be oriented to extend away from the second end 84 and toward the first end 82 of the retainer bracket 26. The first lateral side 94 and the second lateral side 96 may become further apart from each other by orienting the first lateral side 94, the second lateral side 96, or both in a nonparallel relationship with the axis 80. As such, the retainer bracket 26 may increase in width in the first direction.

The first lateral side 94, the second lateral side 96, or both may include a first portion 110 and optionally a second portion 112.

The first portion 110 may extend further from the axis 80 in the first direction or in a direction that extends from the second end 84 toward the first end 82. In FIG. 2, a first portion 110 is provided with the first lateral side 94 and the second lateral side 96; however, it is contemplated that a first portion 110 may be provided with only one lateral side. In the configuration shown, the first portion 110 of the first lateral side 94 and the first portion 110 of the second lateral side 96 may be disposed opposite each other and may extend further apart from each other in the first direction. The first portion 110 may have a linear configuration, a nonlinear configuration, or combinations thereof. For instance, the first portion 110 may be substantially linear or substantially planar in one or more embodiments.

The second portion 112 may extend further from the axis 80 in a second direction that is disposed opposite the first direction or in a direction that extends from the first end 82 toward the second end 84. In FIG. 2, the second portion 112 is provided with the first lateral side 94 and the second lateral side 96; however, it is contemplated that a second portion may be provided with only one lateral side or neither lateral sides. In the configuration shown, the second portion 112 of the first lateral side 94 and the second portion 112 of the second lateral side 96 may be disposed opposite each other and may extend closer together in the first direction or further apart in the second direction. The second portion 112 may have a linear configuration, a nonlinear configuration, or combinations thereof. For instance, the second portion 112 may be substantially linear or substantially planar in one or more embodiments. In addition, it is contemplated that the second portion 112 may not extend further from the axis 80 in the first direction. For instance, it is contemplated that the second portion 112 may extend parallel or substantially parallel to the axis 80 or may extend further from the axis 80.

It is contemplated that the first lateral side 94 and the second lateral side 96 may be provided with other configurations. For instance, the first lateral side 94, the second lateral side 96, or both may not include a second portion 112. As such, the first lateral side 94, the second lateral side 96, or both may extend in a linear manner from the first end 82 to the second end 84. It is also contemplated that the first lateral side 94, the second lateral side 96, or both may extend in a nonlinear manner from the first end 82 to the second end 84. For instance, the first lateral side 94, the second lateral side 96, or both may extend along a curve or an arc between the first end 82 and the second end 84, some examples of which are shown in FIGS. 6 and 7.

Figure 6:
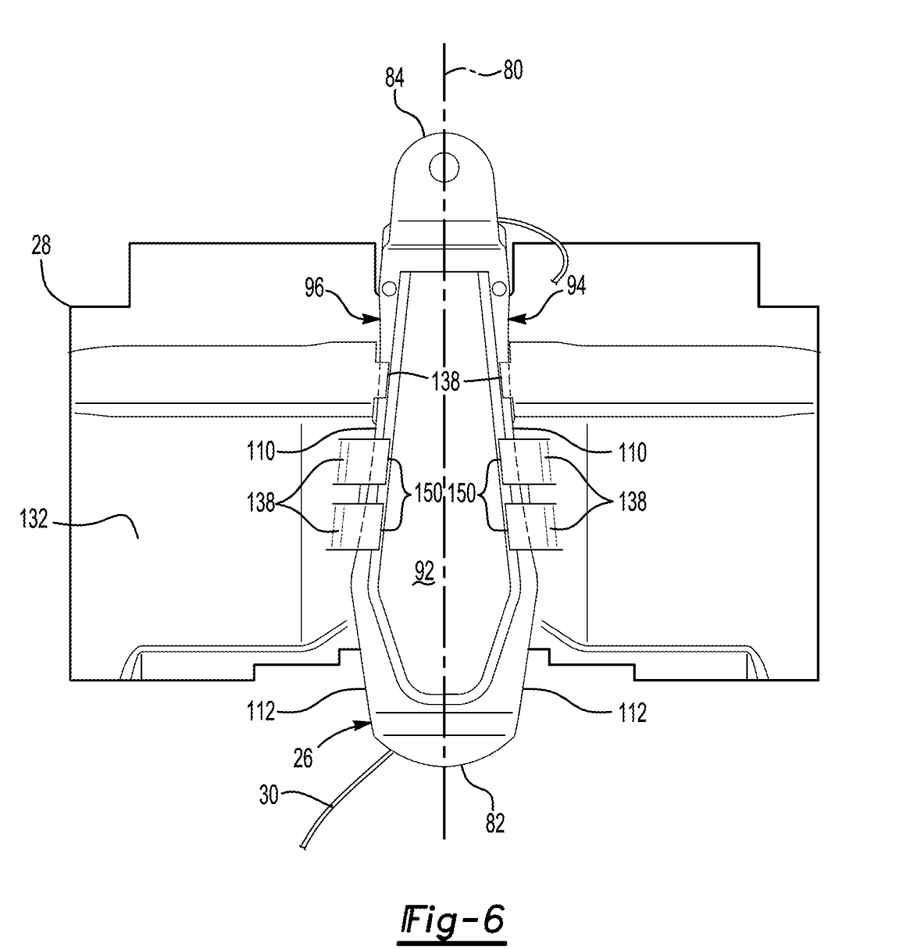
FIGS. 6-8 illustrate additional examples of pad shields installed on retainer brackets.

Referring to FIG. 6, an example is shown in which at least a portion of the first lateral side 94 and at least a portion of the second lateral side 96 is concave. For instance, in FIG. 6 at least part of the first portions 110 of the first lateral side 94 and the second lateral side 96 are illustrated as being concave.

Figure 7:
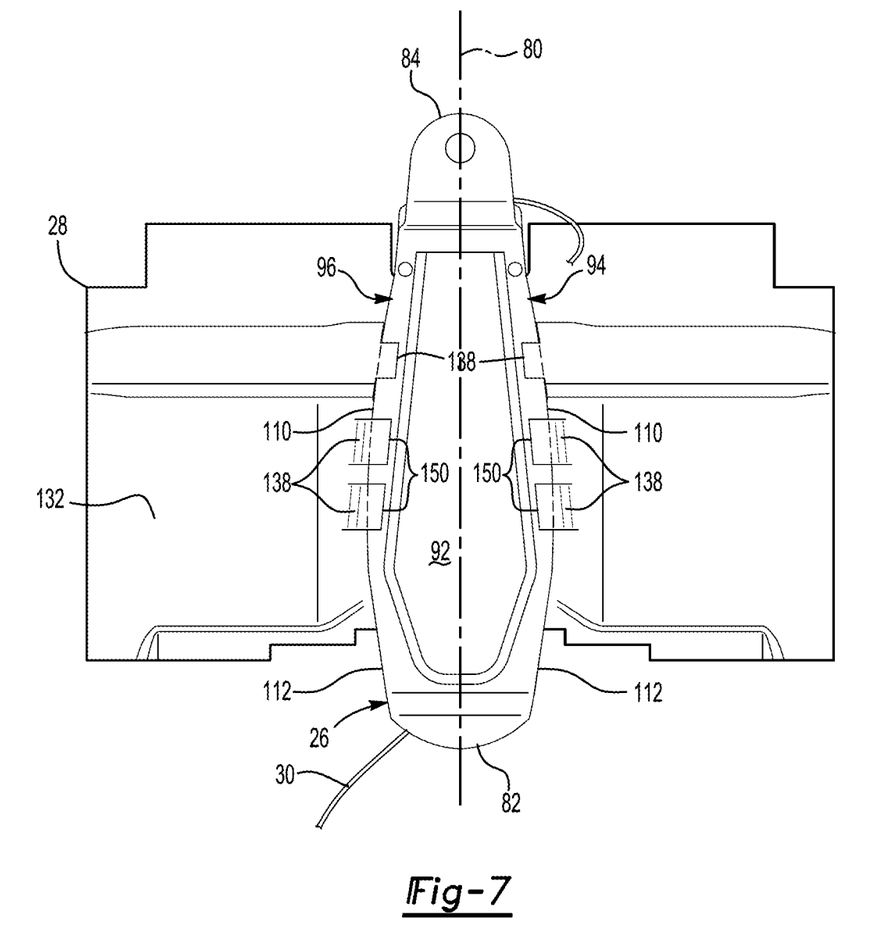

Referring to FIG. 7, an example is shown in which at least a portion of the first lateral side 94 and at least a portion of the second lateral side 96 is convex. For instance, in FIG. 7 at least part of the first portions 110 of the first lateral side 94 and the second lateral side 96 are illustrated as being convex.

Figure 8:
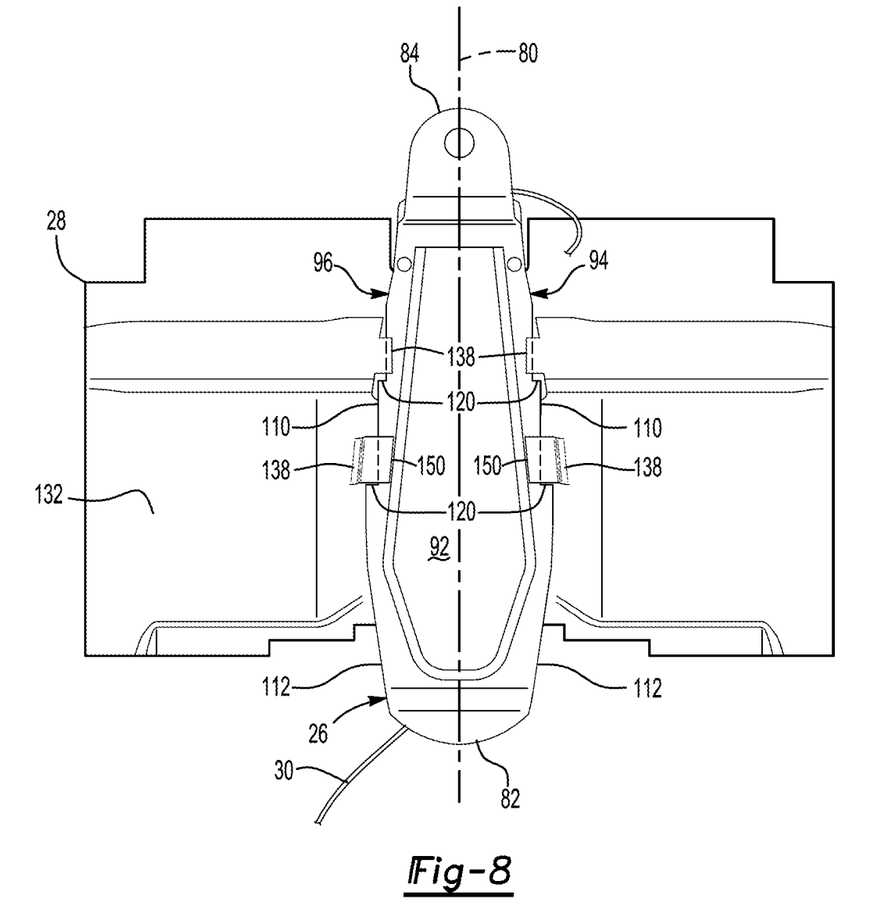

Referring to FIG. 8, another example is shown in which the first lateral side 94, the second lateral side 96, or portions thereof may be provided with a staggered profile or step profile. In such a configuration, one or more steps 120 may be provided with the first lateral side 94, the second lateral side 96, or both. A step 120 may be configured to extend away from the axis 80 such that the first lateral side 94, the second lateral side 96, or both may become wider or extend further from the axis 80 in the first direction as compared to a region of the lateral side that is disposed closer to the second end 84 than the step 120. For instance, a plurality of steps 120 may be provided that may extend progressively further from the axis 80 in the first direction. Any suitable number of steps may be provided. Moreover, it is contemplated that a step 120 may extend perpendicular with respect to the axis 80 or in a non-perpendicular manner, such as at oblique angle with respect to the axis 80, along an arc or curve, or combinations thereof.

Figure 3:
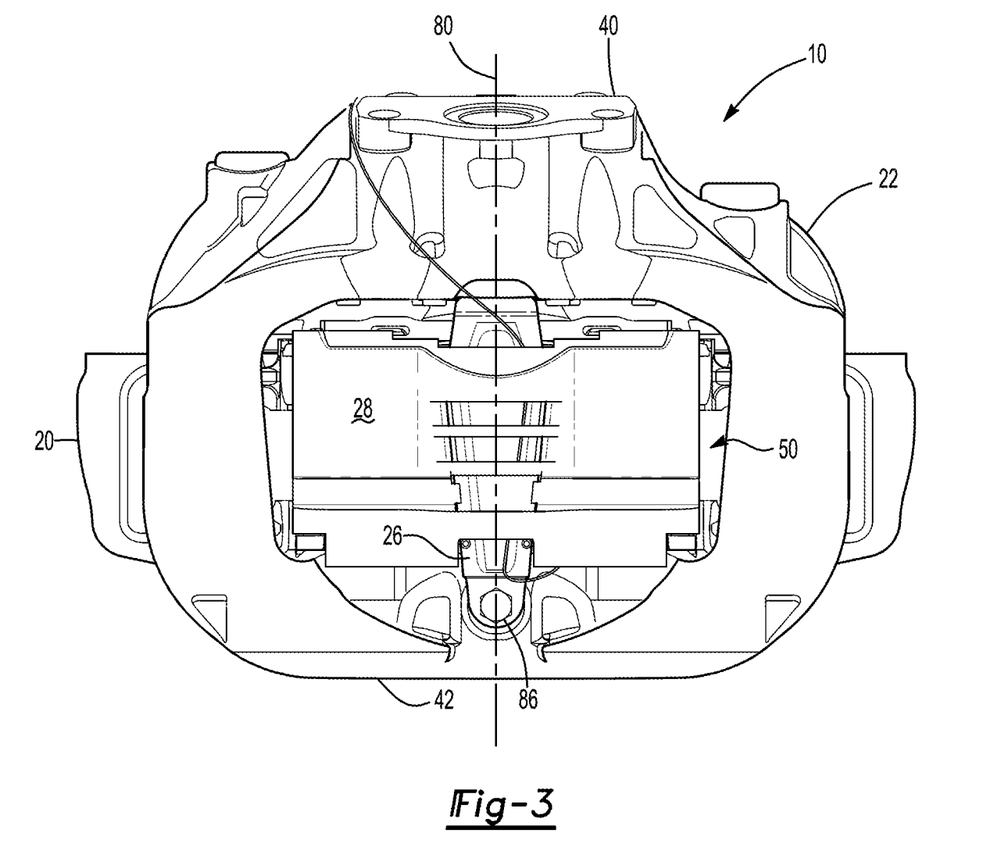
FIG. 3 is a top view of the brake assembly with the pad shield installed on the retainer bracket.

Referring to FIGS. 2 and 3, the pad shield 28 may extend across the opening 50 in the housing assembly 22. The pad shield 28 may help protect the brake pad assemblies 24 from environmental contaminants. The pad shield 28 may be made of any suitable material, such as a metal alloy like stainless steel, carbon fiber, or a polymeric material.

The pad shield 28 may be secured to the retainer bracket 26. More specifically, the pad shield 28 may be installable on the retainer bracket 26 and may be removable from the retainer bracket 26 when the retainer bracket 26 is secured to the housing assembly 22. As such, the pad shield 28 may not be secured underneath the retainer bracket 26 in a manner that requires the retainer bracket 26 to be disassembled from the housing assembly 22 to either install the pad shield 28 on the brake assembly 10 or remove the pad shield 28 from the brake assembly 10. In at least one configuration such as is best shown in FIG. 2, the pad shield 28 may have a first side 130, a second side 132, a first longitudinal edge 134, a second longitudinal edge 136, and a set of retaining features 138. Optionally, the pad shield 28 may include one or more openings 140.

The first side 130 may face away from the brake carrier 20 and the brake pad assemblies 24. In addition, the first side 130 or a portion thereof may face away from the retainer bracket 26.

The second side 132 may be disposed opposite the first side 130. As such, the second side 132 may face toward the brake pad assembly 24 and the retainer bracket 26.

The first longitudinal edge 134 may face toward the caliper housing 40. The first longitudinal edge 134 may extend in a generally vertical direction from the first side 130 toward or to the second side 132.

The second longitudinal edge 136 may be disposed opposite the first longitudinal edge 134. As such, the second longitudinal edge 136 may face toward the caliper bridge 42. The second longitudinal edge 136 may extend in a generally vertical direction from the first side 130 toward or to the second side 132.

Referring to FIGS. 2 and 5, a set of retaining features 138 may couple the pad shield 28 to the retainer bracket 26. The retaining features 138 may extend from the second side 132 of the pad shield 28 toward the retainer bracket 26 and may engage the retainer bracket 26 in a manner that secures the pad shield 28 to the retainer bracket 26. In at least one configuration, the retaining features 138 may extend along the first lateral side 94, the second lateral side 96, or both and may grasp or hook onto the retainer bracket 26. For instance, a retaining feature 138 may have a barb or a hook 150 that may be disposed at a distal end of the retaining feature 138. The hook 150 may extend in an inward direction toward the retainer bracket 26 or toward a plane in which the axis 80 and the rotor axis may be disposed. A hook 150 may wrap around a lateral side of the retainer bracket 26 and may engage or contact the bottom side 92 of the retainer bracket 26.

A retaining feature 138 may be generally aligned with a lateral side. For instance, a first member of the set of retaining features or a first retaining feature 138 may be disposed proximate and may engage the first lateral side 94 while a second member of the set of retaining features or a second retaining feature 138 may be disposed proximate and may engage the second lateral side 96. The first and second retaining features 138, 138 may be aligned with each other or disposed directly opposite each other and on opposite sides of the axis 80. It is also contemplated that retaining features may be staggered such that a retaining feature is not aligned with or disposed opposite another retaining feature.

A plurality of retaining features 138 may be provided that may be spaced apart from each other and that may be aligned with the first lateral side 94. Similarly, a plurality of retaining features 138 may be provided that may be spaced apart from each other and that may be aligned with the second lateral side 96. A retaining feature 138 may be positioned above the friction material 62 and away from tabs or protrusions that extend upward from the backplate 60 so as not to interfere with actuation of the brake pad assemblies 24.

In at least one configuration, some or all of the members of the set of retaining features 138 may be disposed in a nonparallel relationship with the axis 80. For instance, in the configuration shown in FIG. 5, three retaining features 138 are aligned with the first lateral side 94 and three other retaining features 138 are aligned with the second lateral side 96; however, it is contemplated that a greater or lesser number of retaining features 138 may be provided or may be oriented differently. One or more retaining features 138 that are aligned with the first lateral side 94 may be disposed directly opposite a corresponding retaining feature 138 that may be aligned with the second lateral side 96. In such a configuration, one or more retaining features 138 that are disposed closer to the first end 82 of the retainer bracket 26 may be disposed further from the axis 80 than one or more retaining features 138 that are disposed closer to the second end 84. In at least one configuration, the retaining features 138 that are aligned with the first lateral side 94 may be disposed substantially parallel to each other, the retaining features 138 that are aligned with the second lateral side 96 may be disposed substantially parallel to each other, or both. Moreover, one or more retaining features 138 that are aligned with the first lateral side 94 may be disposed in a nonparallel relationship with one or more retaining features 138 that are aligned with the second lateral side 96.

Retaining features 138 may or may not be disposed along a curve or an arc and may or may not be disposed substantially parallel to each other when a corresponding lateral side extends along a curve or an arc as shown in FIGS. 6 and 7.

Referring to FIG. 8, retaining features 138 may also be provided with a staggered profile or a step profile. In such a configuration, retaining features 138 may be aligned with a corresponding step 120 of the retainer bracket 26. In a configuration in which the retainer bracket 26 has multiple steps, the retaining features 138 may be arranged such that retaining features 138 may be arranged further from the axis 80 in the first direction.

Referring to FIG. 2, one or more openings 140 may optionally be provided in the pad shield 28 that may extend from the first side 130 to the second side 132. In at least one configuration, the openings 140 may be axially positioned between the first longitudinal edge 134 and the second longitudinal edge 136. Moreover, the openings 140 may be positioned above the retainer bracket 26 and thus may be at least partially blocked or closed by the retainer bracket 26 when the pad shield 28 is installed on the retainer bracket 26.

The pad shield 28 may be installed on the retainer bracket 26 in various ways.

As one example, the pad shield 28 may be slid along an installed retainer bracket 26 to install or remove the pad shield 28. For instance, the pad shield 28 may be positioned adjacent to the caliper bridge 42 or over the caliper bridge 42 like what is shown in FIG. 2 such that the second side 132 of the pad shield 28 may be generally aligned with the top side 90 of the retainer bracket 26 and such that hooks 150 of the retaining features 138 may be generally aligned with the bottom side 92 of the retainer bracket 26. In addition, the pad shield 28 may be roughly aligned with the axis 80. Next, the pad shield 28 may be slid along the retainer bracket 26 or slid along the axis 80 toward the caliper housing 40 and the first end 82 of the retainer bracket 26. Once the pad shield 26 has been slid a sufficient distance, the retaining features 138 may engage or contact a corresponding side of the retainer bracket 26, such as the first lateral side 94 or the second lateral side 96. Moreover, the hooks 150 may engage or contact the bottom side 92 of the retainer bracket 26, thereby securing the pad shield 28 to the retainer bracket 26. The pad shield 28 may be removed from the retainer bracket 26 by sliding the pad shield 28 in the opposite direction or away from the caliper housing 40.

It is also contemplated that the pad shield 28 may be installed on or slid onto the retainer bracket 26 prior to attaching the retainer bracket 26 to the housing assembly 22 and then the retainer bracket 26 may be mounted to the housing assembly 22. Once the retainer bracket 26 is mounted, the pad shield 28 may be slid off of and slid back onto the retainer bracket 26 without disassembling the retainer bracket 26 from the housing assembly 22.

As another example, the pad shield 28, retaining features 138, or both may be configured to flex such that the pad shield 28 may be snap fit to the retainer bracket 26. For instance, the pad shield 28 may be positioned over the top side 90 of the retainer bracket 26 and then may be moved toward the top side 90 and the opening 50. The pad shield 28 and/or the retaining features 138 may then flex away from the axis 80 and slide along the first lateral side 94 and the second lateral side 96. The pad shield 28 and/or the retaining features 138 may then flex toward the axis 80 and may engage the bottom side 92 of the retainer bracket 26 when a hook 150 reaches the bottom side 92 or reaches an end of a corresponding lateral side, thereby securing the pad shield 28 on the retainer bracket 26. The pad shield 28 may be removed by exerting sufficient force away from the top side 90 of the retainer bracket 26 to disengage the retaining features 138 from the retainer bracket 26 or by sliding the pad shield 28 away from the caliper housing 40 as previously described.

Optionally, a cable 30 may be disposed between the retainer bracket 26 and the pad shield 28. As such, the retainer bracket 26 and the pad shield 28 may cooperate to help position and retain the cable 30. In at least one configuration, the cable 30 may be received in the recess 100 in the retainer bracket 26. The cable 30 may be of any suitable type and may facilitate an electrical connection between a sensor and a controller or control module. In at least one configuration, the sensor may be disposed on the brake assembly 10 and may be of any suitable type. For instance, the sensor may be a temperature sensor, speed sensor, antilock brake sensor, brake pad position sensor, brake pad wear sensor, or the like. The cable 30 may fit between the retainer bracket 26 and the pad shield 28 with a clearance fit or an interference fit.

The brake assembly configurations described above may allow a pad shield to be installed onto and/or removed from a retainer bracket when a retainer bracket is already installed on the brake assembly. As such, a pad shield may be installed without removing the retainer bracket from the housing assembly, which may allow the brake pad assemblies to remain in a secure installed position underneath the retainer bracket. In addition, the pad shield may be installed without removing the retainer bracket, then positioning the pad shield in the opening, and then reinstalling the retainer bracket over the pad shield, which may reduce assembly time and associated costs. Similarly, a pad shield may be removed without removing the retainer bracket from the housing assembly. Accordingly, ease of assembly and disassembly of the pad shield may be improved, such as when the brake assembly is installed on a vehicle. For instance, a pad shield may be easier to install or remove in the limited space around the brake assembly when the brake assembly is installed on a vehicle. Moreover, a pad shield may be installable or removable without removing a vehicle wheel in some situations. The pad shield may be installed without separate additional fasteners, such as a threaded fastener like a bolt that may fasten the pad shield to the retainer bracket, thereby reducing the number of parts, manufacturing costs, and simplifying assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A brake assembly comprising:
   a housing assembly that defines an opening that is adapted to receive a brake pad assembly;
   a retainer bracket that is secured to the housing assembly and extends across the opening, wherein the retainer bracket extends along an axis that extends from a first end of the retainer bracket toward a second end of the retainer bracket that is disposed opposite the first end and the retainer bracket has a first lateral side and a second lateral side disposed opposite the first lateral side, the first lateral side and the second lateral side having first portions that are disposed opposite each other and that extend further apart from each other in a first direction that extends along the axis toward the first end; and
   a pad shield that extends across the opening and is secured to the retainer bracket, wherein the pad shield has a set of retaining features that couple the pad shield to the retainer bracket, a first member of the set of retaining features is disposed proximate the first lateral side, and a second member of the set of retaining features is disposed proximate the second lateral side, and wherein the pad shield is installable onto the retainer bracket and removable from the retainer bracket when the retainer bracket extends across the opening and is secured to the housing assembly.

2. The brake assembly of claim 1 wherein at least some members of the set of retaining features extend to a bottom side of the retainer bracket that faces away from the pad shield.

3. The brake assembly of claim 1 wherein the retainer bracket includes a top side that faces toward the pad shield, a bottom side disposed opposite the top side, the first lateral side extends between the top side and the bottom side, and the second lateral side extends between the top side and the bottom side.

4. The brake assembly of claim 1 wherein at least some members of the set of retaining features are disposed in a nonparallel relationship with the axis.

5. The brake assembly of claim 1 wherein a third member of the set of retaining features is disposed proximate the first lateral side, and a fourth member of the set of retaining features is disposed proximate the second lateral side, the third member and the fourth member are disposed closer to the first end of the retainer bracket than the first member and the second member, and the third member and the fourth member are disposed further from the axis than the first member and the second member.

6. The brake assembly of claim 5 wherein the first member is disposed substantially parallel to the third member and the second member is disposed substantially parallel to the fourth member.

7. The brake assembly of claim 6 wherein the first member and the third member are disposed in a nonparallel relationship with the second member and the fourth member.

8. The brake assembly of claim 1 wherein the housing assembly includes a caliper housing and a caliper bridge secured to the caliper housing, wherein the caliper housing and the caliper bridge cooperate to define the opening and wherein the first end of the retainer bracket is disposed on the caliper housing and the second end of the retainer bracket is disposed on the caliper bridge.

9. The brake assembly of claim 1 wherein at least a portion of the first lateral side is disposed in a nonparallel relationship with the second lateral side.

10. The brake assembly of claim 1 wherein the first lateral side and the second lateral side have second portions that are disposed opposite each other and that extend further apart from each other in a second direction that extends along the axis from the first end toward the second end.

11. The brake assembly of claim 1 wherein a cable is disposed between the retainer bracket and the pad shield.

12. The brake assembly of claim 11 wherein the retainer bracket includes a recess that extends from a top side of the retainer bracket that faces toward the pad shield, wherein the cable is received in the recess.

13. The brake assembly of claim 1 wherein the first lateral side is provided with a step profile.

14. A method of assembling a brake assembly, comprising:
   providing a housing assembly that has an opening;
   positioning a retainer bracket on the housing assembly such that the retainer bracket extends across the opening, wherein the retainer bracket has first and second lateral sides that are disposed opposite each other and extend between a first end and a second end of the retainer bracket;
   securing the retainer bracket to the housing assembly such that the retainer bracket does not move with respect to the housing assembly; and
   installing a pad shield on the retainer bracket after the retainer bracket is secured to the housing assembly, wherein the pad shield has first and second retaining features that extend along the first and second lateral sides of the retainer bracket, respectively, to secure the pad shield to the retainer bracket.

15. The method of claim 14 wherein a cable is secured between the retainer bracket and the pad shield when the pad shield is installed.

16. The method of claim 14 wherein the housing assembly includes a caliper housing and a caliper bridge secured to the caliper housing, the first end is disposed on the caliper housing, the second end is disposed on the caliper bridge, and wherein installing the pad shield includes sliding the pad shield along the retainer bracket in a first direction that extends from the second end toward the first end.

17. The method of claim 16 wherein the pad shield is removable from the retainer bracket by sliding the pad shield along the retainer bracket in a second direction that extends from the first end toward the second end while the retainer bracket remains secured to the housing assembly.

18. The method of claim 16 wherein the retainer bracket increases in width in a direction that extends from the second end to the first end.

19. A brake assembly comprising:
   a housing assembly that defines an opening that is adapted to receive a brake pad assembly;
   a retainer bracket that is secured to the housing assembly and extends across the opening, wherein the retainer bracket has first and second lateral sides that are disposed opposite each other and that extend between first and second ends of the retainer bracket; and
   a pad shield that extends across the opening and has first and second retaining features that extend along the first and second lateral sides of the retainer bracket, respectively, to secure the pad shield to the retainer bracket, wherein the pad shield is installable onto the retainer bracket and removable from the retainer bracket when the retainer bracket extends across the opening and is secured to the housing assembly.

20. The brake assembly of claim 19 wherein the first and second lateral sides have first portions that are disposed opposite each other and that extend further apart from each other in a first direction that extends from the second end toward the first end.

21. The brake assembly of claim 19 wherein the first and second retaining features are not disposed inside the retainer bracket.

22. The brake assembly of claim 19 wherein the first lateral side is provided with a step profile.

\* \* \* \* \*